No. 886,888. PATENTED MAY 5, 1908.
W. G. STEWART.
BATH TUB SUPPLY PIPE CONNECTION.
APPLICATION FILED FEB. 11, 1907.
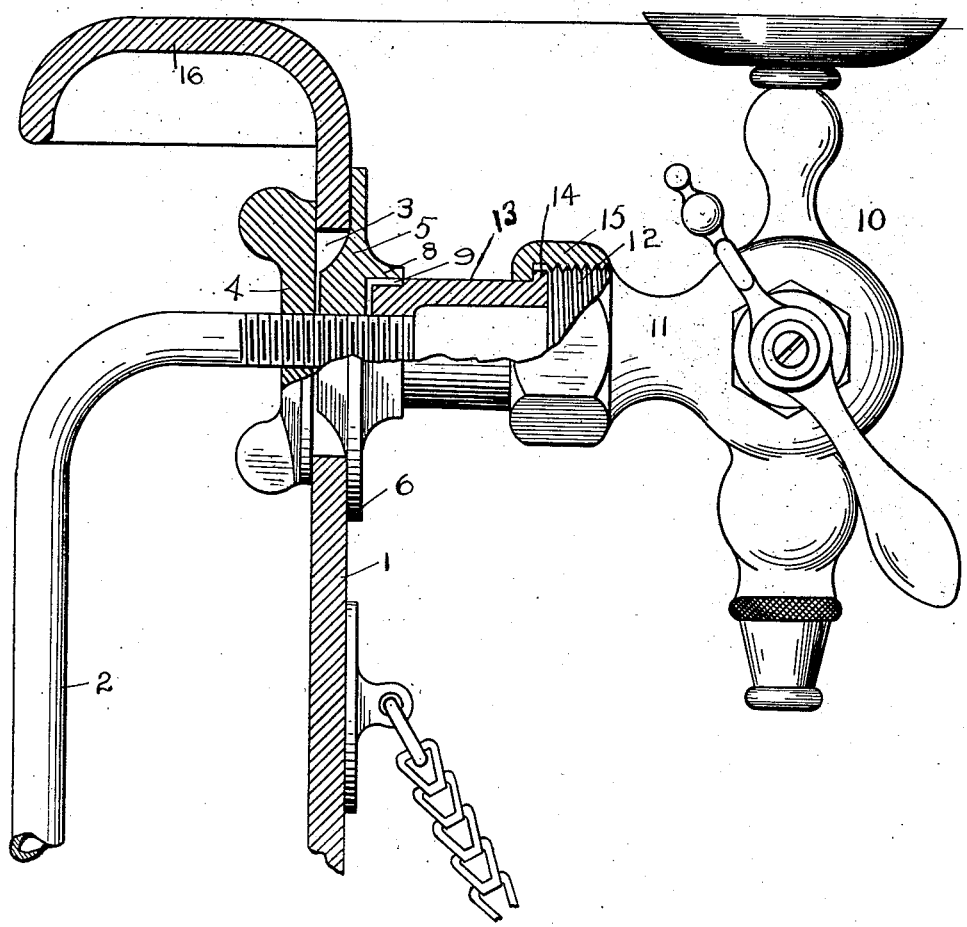
WITNESSES:
Brennan B. West
G. A. Myers
INVENTOR.
William G. Stewart
BY
Bates, Fouts & Hull
ATTYS.

UNITED STATES PATENT OFFICE.

WILLIAM G. STEWART, OF CLEVELAND, OHIO.

BATH-TUB SUPPLY-PIPE CONNECTION.

No. 886,888.      Specification of Letters Patent.      Patented May 5, 1908.

Application filed February 11, 1907. Serial No. 356,733.

*To all whom it may concern:*

Be it known that I, WILLIAM G. STEWART, a citizen of the United States, residing at Cleveland, in the county of Cuyahoga and State of Ohio, have invented a certain new and useful Improvement in Bath-Tub Supply-Pipe Connections, of which the following is a full, clear, and exact description, reference being had to the accompanying drawings.

My invention relates to bath-tub faucets and has for its object to improve the manner of connecting such faucets with the supply pipes with which they are associated, to provide tight joints between the said pipes and faucets and to render the various parts of the connections convenient of access.

The universal commercial manner of connecting the supply pipes and the faucets of bath tubs is by means of an inground joint located at the outside of the tub, said joint being formed between the supply pipe and a sleeve which extends through an aperture in the end of the tub, said sleeve being connected to the faucet fixture by means of a gland. Connection between the supply pipe and this sleeve is made by means of a gland, by tightening which the in-ground joint is more or less closed. In order to connect the pipe and fixture, it is necessary to operate on the outside of the tub and under the rim of the same, making it difficult to apply and operate a wrench. This difficulty is frequently increased by the small extent of space provided for the tub, such space often being so short as to leave practically no clearance between the end of the tub and the wall. These restrictions, with the location of the supply pipe beneath the rim, make the application of a wrench to the gland very difficult. Furthermore, the joint is faulty and frequently leaks and is considered generally by plumbers as one of the most undesirable repair jobs which they are called upon to make.

The object of my invention is to obviate the above difficulties, provide a better and tighter joint, and at the same time economize in the cost of material used in making the joint.

I accomplish these results by the embodiment shown in the drawing, which represents a view, partly in elevation and partly in section, of a bath-tub faucet, a supply pipe and connecting means therebetween, with so much of a tub as is necessary to show the manner of applying my invention thereto.

In the drawing, 1 represents the end of the bath tub and 2 the supply pipe. As will appear from the drawing, the end of this pipe is threaded for a considerable distance and, when in position, projects through the aperture 3 in the end of the tub. Before inserting the end of the supply pipe through the aperture 3, I thread back upon the end thereof a wing nut 4. Then, after the pipe has been inserted through the aperture, I thread upon the same a nut 5, between which and the wing nut 4 the opposite sides of the end wall of the bath tub are embraced, the pipe is properly secured and positioned with respect to the tub, and an ornamental closure for the aperture is provided. The said nut 5 has a central transverse flange 6 which is provided with a milled edge and the body of the nut is reduced and tapered rearwardly from said flange to adapt the nut for apertures of varying sizes in the end walls of bath tubs. The correspondingly reduced and tapered front portion 8 of said nut is provided with a recess 9, for a purpose to be described hereinafter.

10 denotes a faucet of usual standard construction, such as is employed generally in bath tubs. This faucet is provided with the usual central connection 11 having its rear end provided with an external screw thread 12.

13 denotes a short sleeve the rear end of which is provided with an internal thread adapted to be secured upon the threaded end of pipe 2. The front end of said sleeve 13 is provided with a flange 14, by means of which and a gland nut 15 said sleeve may be firmly clamped against the rear end of the faucet fixture. The rear end of the sleeve 13 is squared to permit the application of a wrench thereto. By suitable adjustment of the nuts 4 and 5, this square end may be entirely covered by the overhanging end 8 of nut 5, giving the effect of a continuous ornamental connection extending from the fixture to the inner surface of the end of the tub.

In making the connection, the nuts 4 and 5 are threaded back upon the pipe 2 a sufficient distance to allow the flange 8 to clear the squared end 13. 13 is then screwed onto 2, the thread of the latter being first coated with white lead to prevent leakage, and when the joint is effected the nut 5 may be adjusted toward sleeve 13 until the flange 8 entirely covers the squared end of said sleeve. The wing nut 4 is then adjusted toward 5 until it firmly engages the outer wall of the tub and holds pipe 2 rigid with said tub. The faucet 10 may then be connected to sleeve 13 by means of the gland nut 14. By this arrangement, the joint between the pipe 2 and the sleeve 13 is located within the tub, so that, in case of leakage, no injury will be done to the bath room and ceilings of the rooms below. Furthermore, the joint is located at a place which is easily accessible for the application of a wrench, enabling any repairs, if necessary to be made, to be accomplished with no inconvenience from being compelled to work under the overhanging rim 16 of the tub. As a further advantage, the sleeve 13, which is made of brass, is comparatively short and correspondingly cheap, while, in the commercial connection, the sleeve which is used in place of the sleeve 13 must be of sufficient length to extend from the point of connection with the faucet through the end wall of the bath tub a sufficient distance to permit the application of the gland to the outer end thereof.

It will be apparent from the above description, taken in connection with the drawing, that I have produced a simple, effective and economical form of connection between the supply pipes and the faucets of bath tubs and one that is not only highly ornamental in appearance but is easily accessible for purposes of repair.

Having described my invention I claim:

1. The combination, with a bath tub having an aperture in an end wall thereof, of a supply pipe having a threaded end projecting through said aperture and within the tub, said supply pipe having no detachable joint adjacent to said aperture, a sleeve having one end threaded onto the end of said supply pipe and having its other end provided with a flange, a bath tub faucet having a connection provided with a threaded end, a gland nut securing said connection to the flanged end of the sleeve, and means adjustably mounted on said pipe for clamping the same to the wall of the tub, substantially as specified.

2. The combination, with a bath tub having an aperture in the wall thereof, of a supply pipe having a threaded end projecting through said aperture, said supply pipe having no detachable joint adjacent to said aperture, a sleeve threaded onto the end of said supply pipe, a bath tub faucet, means for connecting said faucet to said sleeve, and a pair of nuts on said pipe, one being on the outside of the tub and the other being on the inside thereof, said nuts being adapted to engage opposite surfaces of the tub to retain the supply pipe connections and faucet in fixed relation thereto, substantially as specified.

3. The combination, with a bath tub having an aperture in the wall thereof, of a supply pipe having a threaded end projecting through said aperture, a sleeve connected to the end of said supply pipe, a bath tub faucet, means for connecting said faucet to said sleeve, and a pair of nuts on said pipe, one being on the outside of the tub and having hand operating means and the other being on the inside thereof and having a tapered rear face, said nuts being adapted to engage opposite surfaces of the tub to retain the supply pipe connections and faucet in fixed relation thereto.

4. The combination, with a bath tub having an aperture in an end wall thereof, of a supply pipe having a threaded end projecting through said aperture, a sleeve having a squared end provided with an internal thread adapted to engage the threaded end of the supply pipe, a faucet, means for connecting said faucet to the other end of said sleeve, a nut threaded on said pipe outside of the wall of the bath tub, and a nut threaded on said pipe on the inner side of said wall and interposed between the same and the sleeve, said nut having a central flange projecting longitudinally therefrom and a recess within said flange adapted to receive the squared end of said sleeve, substantially as specified.

5. The combination, with a bath tub having an aperture in the end wall thereof, of a supply pipe having a threaded end projecting through said aperture, a sleeve having a squared end provided with an internal thread adapted to engage the threaded end of the supply pipe, a faucet, means for connecting said faucet to the other end of said sleeve, a nut threaded on said pipe outside of the wall of the bath tub, and a nut threaded on said pipe on the inner side of said wall and interposed between the same and the sleeve, said nut having a central flange projecting longitudinally therefrom and a recess within said flange adapted to receive the squared end of said sleeve and said nut also having a tapered central flange projecting longitudinally therefrom in a direction the reverse of the last-mentioned flange, substantially as specified.

6. As a means for connecting a supply pipe with a bath tub faucet and in combination with such pipe, a pair of nuts adapted to be applied to the threaded end of said supply pipe on opposite sides of the end wall of the tub, the outer nut being a wing nut and the inner nut having a central flange adapted to cover the aperture in the wall of the tub, a sleeve having one end adapted to be threaded on the end of said pipe and having at its opposite end a flange, and a gland nut on said sleeve adapted to connect the same to the faucet, substantially as specified.

7. As a means for connecting a supply pipe with a bath tub faucet and in combination with such pipe, a pair of nuts adapted to be applied to the threaded end of said supply pipe on opposite sides of the end wall of the tub, the outer nut being a wing nut and the inner nut having a central flange adapted to cover the aperture in the wall of the tub, a sleeve adapted to be threaded on the end of said pipe and having in its opposite end a flange, and a gland nut on said sleeve adapted to connect the same to the faucet, said inner nut having a recessed flange adapted to cover the adjacent end of the sleeve, substantially as specified.

8. The combination, with a bath-tub having an aperture in the wall thereof, of a supply-pipe having an end projecting through said aperture, said supply pipe having no detachable joint adjacent to said aperture, a bath-tub faucet, means located entirely within the tub for connecting said faucet to said pipe, and means for securing said pipe to the wall of the bath-tub, substantially as specified.

9. The combination, with a bath-tub having an aperture in the wall thereof, of a supply-pipe having an end projecting through said aperture, said supply pipe having no detachable joint adjacent to said aperture, a bath-tub faucet, connections located entirely within the tub for securing the faucet to the supply-pipe, and means adjustably mounted on the pipe for clamping the same to the wall of the tub, substantially as specified.

10. The combination, with a bath-tub having an aperture in the wall thereof, of a supply-pipe having an end projecting through said aperture, said supply pipe having no detachable joint adjacent to said aperture, a bath-tub faucet, a sleeve located entirely within the tub and connecting the faucet to the end of the supply-pipe, and adjustable clamping means for securing the pipe to the wall of the tub, substantially as specified.

11. The combination with a lavatory member having an aperture in its wall; of a supply pipe projecting therethrough, said supply pipe having no detachable joint adjacent to said aperture, a faucet, means located entirely on the exposed side of said member for connecting the faucet to the pipe, and means mounted on said pipe for clamping it to said member.

12. The combination, with a sleeve and a faucet, one being flanged and the other threaded, and a gland nut connecting the flange and threads; of a bath tub having an aperture in the end wall thereof, a supply pipe having a threaded end projecting through said aperture and screwed into the sleeve, said supply pipe having no detachable joint adjacent to said aperture, and means adjustably mounted on said pipe for clamping it to the wall of the tub.

In testimony whereof, I hereunto affix my signature in the presence of two witnesses.

WILLIAM G. STEWART.

Witnesses:
G. A. MYERS,
J. B. HULL.